United States Patent Office 3,179,554

Patented Apr. 20, 1965

3,179,554

ADHESIVE FOR AND PROCESS OF BONDING α-OLEFIN HYDROCARBON POLYMERS

Edward Karcher Gladding, New Castle, and Donald Nellis Robinson, Wilmington, Del., assignors to E. I. du Pont de Nemours and Company, Wilmington, Del., a corporation of Delaware No Drawing. Filed Aug. 27, 1962, Ser. No. 219,751
18 Claims. (Cl. 161—216)

This invention relates to the adhesive bonding of α-olefin hydrocarbon polymers and, more particularly, to composite articles and a process for their preparation.

Normally solid, chain-saturated α-olefin hydrocarbon copolymers are acquiring increasing importance today in the manufacture of a wide variety of useful products. For many applications adhered assemblies are needed wherein these copolymers are bonded to metals. Unfortunately, however, presently available adhesive systems are, for one or more reasons, not completely satisfactory. In particular, adhered assemblies prepared using conventional adhesives have exhibited undesirably low peel strengths.

It is, therefore, an object of this invention to provide a process for bonding chain-saturated, α-olefin copolymers to metals. Another object is to provide a process for the preparation of adhered composite articles from such materials. A further object is to provide curable assemblies of such materials as well as the cured articles prepared therefrom. Yet another object is to provide such cured articles having improved peel strengths. Other objects will appear hereinafter.

These and other objects are accomplished in accordance with this invention by the adhesion of normally solid, chain-saturated curable α-olefin hydrocarbon polymers to metals by applying therebetween the following sequence of layers: (I) an adhesive layer of chlorosulfonated polymer in contact with said α-olefin copolymer; (II) a layer of curable rubber selected from the group consisting of neoprene, styrene-butadiene rubber and natural rubber; and (III) a layer of a rubber-metal adhesive selected from the group consisting of monomeric organic polyisocyanates and perchlorinated natural rubber; and (B) subjecting the above components to curing conditions.

Structures prepared in accordance with this invention have the following schematic arrangement:

α-Olefin copolymer
Chlorosulfonated polymer
Neoprene, SBR or natural rubber
Rubber-metal adhesive
Metal The normally solid, chain-saturated α-olefin hydrocarbon copolymers which can be treated with the novel tri-layer adhesive system of the present invention are the normally solid copolymers at least two α-monoolefins or of at least one α-monoolefin and at least one non-conjugated hydrocarbon diene. These α-monoolefins have the structure $R—CH=CH_2$ where R is H or $C_1$–$C_{16}$ alkyl. Representative dienes include dicyclopentadiene; open-chain $C_6$–$C_{22}$ dienes having the structure

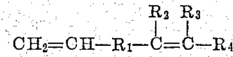

$$CH_2=CH-R_1-\overset{R_2}{\overset{|}{C}}=\overset{R_3}{\overset{|}{C}}-R_4$$

wherein $R_1$ is an alkylene radical, $R_2$ and $R_3$ are independently selected from the group consisting of hydrogen and alkyl radicals, and $R_4$ is an alkyl radical; a 5-alkenyl-substituted 2-norbornene; 5-methylene-2-norbornene; and a 2-alkyl-2,5-norbornadiene.

Representative examples of useful α-monoolefins having the structure $R—CH=CH_2$ include: ethylene; propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene.

Representative examples of copolymers made from these α-monoolefins and the above-described non-conjugated dienes and their preparation are described in U.S. Patents 2,933,480 and 3,000,866. The preferred copolymers are ethylene/propylene; ethylene/propylene/dicyclopentadiene; ethylene/1,4-hexadiene; and ethylene/propylene/1,4-hexadiene. Copolymers of from about 30 to 70 weight percent ethylene, about 30 to 70 weight percent propylene and up to about 5 weight percent 1,4-hexadiene or dicyclopentadiene are particularly preferred.

The α-olefin copolymers are compounded with suitable curing agents before being coated. The copolymers which are essentially free from ethylenic unsaturation (e.g., ethylene/propylene copolymer) are preferably compounded with peroxide curing agents. The copolymers containing side-chain carbon-carbon double bonds are preferably compounded with sulfur curing agents, although peroxide curing agents can be used.

The preferred sulfur curing system present in the α-olefin copolymer, particularly when it contains side-chain unsaturation, consists of sulfur, zinc oxide, and a curing accelerator. About 0.2–2 parts, preferably 0.75–2 parts, of sulfur are present for every 100 parts by weight of the α-olefin copolymer. Compositions containing concentrations below 0.2 part per 100 provide less satisfactory adhesion; concentrations above 2 parts are usually unnecessary. About 5 parts per 100 of zinc oxide are supplied although it is to be understood that higher or lower concentrations can be employed. The concentration of the metal oxide is important since it, in conjunction with sulfur and accelerator, controls the ultimate state of bonding. At concentrations of 3 to 10 parts by weight per 100 parts by weight of the α-olefin copolymer, the rate and state of cure are very satisfactory. Concentrations above 10 parts per 100 are generally unnecessary. Concentrations below 2 parts per 100 are sometimes less satisfactory for developing and maintaining adequate vulcanizate properties. The best accelerators for the vulcanization are also the ones used for curing natural rubber. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate; the zinc salt of dimethyldithiocarbamic acid; the piperidine salt of pentamethylenedithiocarbamic acid;

2-mercaptothiazoline; 2-mercaptothiazole; N,N-diethylthiocarbamyl-2-mercaptobenzothiazole, and 2,2′-dithiobisbenzothiazole. A representative and preferred accelerator includes 2-mercaptobenzothiazole (0.5 part) and tetramethylthiuram monosulfide (1.5 parts). Those skilled in the art can select by routine empirical experiments the best combinations of accelerators when curing a particular assembly. In addition to the above-described components, the novel composition may include such optional components as conventional antioxidants.

Any of the organic peroxide curing systems known in the art for curing natural rubber or ethylene/propylene type elastomers can be used to compound the α-olefin copolymers (saturated or unsaturated), the styrene-butadiene rubber, and the natural rubber. The alkyl, alkylaryl or acyl provides or per esters (e.g. benzoyl peroxide, phthaloyl peroxide, tertiary butyl perbenzoate, or dicumyl peroxide), optionally having one or more H atoms replaced by Cl, are suitable; activators such as S, Se, Te, or a quinone compound such as p-benzoquinone can also be present; this curing system is described in Belgian Patent 573,467/59. The preferred peroxides, described in U.S. Patent 2,826,570 have the formula

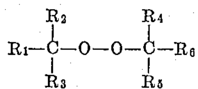

wherein $R_1$ and $R_6$ are aryl and $R_2$–$R_5$ are H or $C_1$–$C_4$ alkyl; their use in curing ethylene/propylene copolymers is described in U.S. Patent 3,012,016. Other discussions of suitable curing procedures are contained in: French Patent 1,204,572; U.S. Patent 2,958,672; Australian applications 53,481/59; 62,238/60 and 62,897/60; Belgian Patent 593,550/61; British Patent 873,598/61 which discloses activation with polynitroso compounds such as N-methyl-N,4-dinitrosoaniline and poly(1,4-dinitrosobenzene); and U.S. Patents 2,997,452 and 3,012,020.

In operating the present invention, a wide variety of sulfochlorinated normally solid chain-saturated hydrocarbon polymers can be used in preparing the adhesive composition which is used to coat the α-olefin copolymer. Representative sulfochlorinated polymers contain about 5–50% by weight chlorine and about 0.25%–3% sulfur by weight. They may be prepared by reacting saturated hydrocarbon (or chloro-substituted hydrocarbon) polymers with a mixture of chlorine and sulfur dioxide (see U.S. Patent 2,212,786 for a representative process).

Representative chlorosulfonated polymers of this type include: chlorosulfonated polymers containing 25–37% chlorine and 0.4–3% sulfur made from polyethylene, ethylene/vinyl chloride interpolymers, or ethylene/vinylidene chloride interpolymers (U.S. Patent 2,586,363); chlorosulfonated polymers containing 20–45% chlorine and 0.25–3% sulfur made from hydrogenated homopolymers of conjugated hydrocarbon dienes, hydrogenated interpolymers of at least two conjugated hydrocarbon dienes, hydrogenated interpolymers of conjugated hydrocarbon dienes and chloroprene, or hydrogenated interpolymers of hydrocarbon dienes and hydrocarbon (and chlorohydrocarbon) monoolefins (U.S. Patent 2,646,422); chlorosulfonated interpolymers of at least two $C_2$–$C_6$ alpha olefins, containing 6–35% chlorine and 0.5–3% sulfur (U.S. Patent 2,879,261); chlorosulfonated polyethylene having a chlorine content of from 38–48% and a sulfur content of 0.1–3%, the polyethylene prior to sulfochlorination having a density of from 0.935 to about 0.960, a melt index of from 0.2 to about 200, and a solubility in $CCl_4$ of at least 1% by weight (U.S. Patent 2,982,759 of Heuse).

The preferred chlorosulfonated polyethylene contains about 1% sulfur by weight and about 26.5% chlorine by weight; the polyethylene before sulfochlorination has a density of about 0.960 and a melt index of about 0.7. An alternative chlorosulfonated polyethylene contains 1.5% sulfur by weight and 30% chlorine by weight; the polyethylene before sulfochlorination has a density of 0.912 and a melt index of 10. Still another useful chlorosulfonated polyethylene contains 1.6% sulfur by weight and 44% chlorine by weight; the polyethylene before sulfochlorination has a density of 0.922 and a melt index of 100. Yet another chlorosulfonated polyethylene which can be used contains 0.97% sulfur and 35.4% chlorine and has a specific gravity of 1.18; the polyethylene before chlorosulfonation has a density of 0.96 and a melt index of about 0.5. Mixtures of any of these chlorosulfonated polyethylenes with each other or any of the other chlorosulfonated polymers described in the above paragraph can be employed in the present invention.

It is preferred to dissolve the chlorosulfonated polyethylene first in the volatile inert liquid and thereafter to introduce the carbon black when desired; however, the order of addition to the volatile solvent is not critical. Optimum performance requires that all the components be homogeneously dispersed and this is accomplished by conventional agitation procedures such as ball milling. The mixing can frequently be carried out at room temperature (20–30°C.); higher temperatures can be employed when desired to reduce the viscosity and accelerate the mixing. The maximum temperature employed can readily be selected by those skilled in the art based on such considerations as the boiling point of the inert solvent. The adhesive composition is indefinitely stable and can be stored at room temperature for long periods of time such as three months.

A chlorosulfonated polyethylene solution can be used alone or carbon black can be dispersed in the chlorosulfonated polyethylene solution in an amount sufficient to give a smooth-flowing composition. Those skilled in the art can determine by routine empirical experiments the proper concentration needed to get the best results for a particular chlorosulfonated polyethylene/solvent combination for a specific application. For representative compositions containing about 3 to 5% adhesive composition by weight, about 30 to 50 parts of carbon black, preferably about 40, are present for every 100 parts of copolymer. When, under these circumstances, more than 50 parts of carbon black are present, the resulting adhesive composition tends to be grossly inhomogeneous and displays less satisfactory adhesive properties than the compositions made within the prescribed range. Any of the conventional reinforcing blacks can be used. Representative blacks include: furnace blacks, which are preferred; channel blacks; and thermal blacks. Mixtures of blacks can be employed when desired.

The chlorosulfonated polyethylene composition is made up as a homogeneous dispersion in a volatile inert organic liquid. By "volatile" is meant a liquid which boils at standard pressure below about 160° C. The preferred solvent is carbon tetrachloride (boiling point 78° C.). Useful alternatives include: other chlorinated aliphatic hydrocarbons such as methylene chloride (boiling point 32° C.), chloroform (boiling point 71° C.), methylene bromide (boiling point 98° C.), and symmetrical tetrachloroethane (boiling point 147°C.). Aromatic hydrocarbons such as benzene (boiling point 80° C.), toluene (boiling point 111° C.), ethyl benzene (boiling point 135° C.), ortho-xylene (boiling point 144° C.), and isopropyl benzene (cumene) (boiling point 153° C.); and chlorinated aromatic hydrocarbons such as chlorobenzene (boiling point 132° C.). Suitable solvents are more particularly discussed in U.S. Patent 2,752,317.

The second layer of a tri-layer adhesive system is an elastomeric substrate of neoprene, natural rubber, or styrene-butadiene rubber. The term "neoprene" as used herein refers to elastomeric polymers and copolymers of 2-chloro-1,3-butadiene. The styrene-butadiene rubber used in the present invention contains about 3–43% styrene monomer units by weight of the copolymer, the remainder being butadiene monomer units. The preferred copolymer, which contains about 23.5% styrene monomer units by weight, has a viscosity-average molecular weight of about 270,000; its transition temperature is about −62° C.; its density at 25° C. is about 0.93 gram/cubic centimeter; the Mooney viscosity of raw uncompounded polymer, read after 4 minutes operation of the large rotor at 100° C., ranges between about 46–54.

The α-olefin copolymers having a side-chain carbon-carbon double bonds, the natural rubber, and the styrene-butadiene rubber which are to be cured when making the adhered compositions in accordance with the present invention are compounded according to the well-known recipes in the art for sulfur curing. It is to be understood that various modifications of the sulfur-cured procedures may be employed depending upon the stock.

Various procedures and modifications of sulfur curing are more substantially described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, Davis and Blake, published by Reinhold Publishing Corp., New York, 1937, chapter 6; Introduction to Rubber Technology, edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099.

The neoprene stocks which are to be employed in the present invention are compounded according to the recipes well-known in the art. Further details are given in Introduction to Rubber Technology, supra at pages 340–348; Synthetic Rubber Technology, W. S. Penn, Maclaren and Sons, Ltd., London, 1960, vol. 1, pages 179–232; The Neoprenes, N. L. Catton, E. I. du Pont de Nemours & Co., Inc., Wilmington, Delaware, 1953; and the Applied Science of Rubber, supra at pages 346–370, 397–400, and 1015–1048.

The elastomeric substrate coating compositions are made up as homogeneous dispersions in volatile inert organic liquids. Any of the above-described organic liquids useful for dissolving the sulfochlorinated polyethylene can be employed here. Since the order of addition is immaterial, it is possible to dissolve the natural rubber (or styrene-butadiene rubber or neoprene) in one solvent and disperse the remaining components of that substrate in one or more other solvents and to combine all of the mixtures; it is preferred to dissolve the elastomer and then add the remaining components. The elastomer adhesive solution is indefinitely stable and can be stored at room temperature for long periods of time such as three months.

The layers are separately applied; in the resulting composite article the α-olefin copolymer adjoins the sulfochlorinated saturated hydrocarbon polymer and the organic polyisocyanate (or perchlorinated natural rubber) contacts the metal.

The sequence in which the tri-layer adhesive composition is applied is not critical as long as the layers in the composite article are in the proper order. It is generally most convenient to coat the α-olefin copolymer successively with the chlorosulfonated polymer and elastomer substrate (neoprene, styrene-butadiene rubber or natural rubber) and join this assembly to metal coated with the organic polyisocyanate or the perchlorinated natural rubber. However, all the layers can be built up from either the α-olefin copolymer or the metal. Other variations will readily occur to those skilled in the art. Thus, compounded neoprene can be separately applied to items coated with chlorosulfonated polymer and organic polyisocyanate, the neoprene surfaces thereafter being joined. The layers are applied individually. If, prior to coating, the components of all the layers are mixed together to give a single composition, the adhered assembly finally obtained displays and adhesive strength inferior to that obtained when the tri-layer cement of the present invention is employed.

The members of the tri-layer cement are generally used as solutions or dispersions in volatile inert liquids. When desired, the organic polyisocyanates can be applied as liquids when they are normally liquid at room temperature or conveniently melted without decomposition. The tri-layer cement is applied in the conventional manner familiar to those skilled in the adhesive art using brushes, rollers, or swabs and the like. The thickness of a particular coating needed will be somewhat a function of the solids content of the dispersion supplied; it is generally preferred that the amount of each layer applied be sufficient to leave a dry coating about 1–5 mils thick. Thicker coats are often not needed for the present purposes, are unnecessarily costly, and inconvenient in that longer drying times are required. Those skilled in the art can determine by empirical experiments the optimum thickness needed for a particular application.

After each coating has been applied the volatile solvent is allowed to evaporate. This often requires about 0.5 to 2 hours at 25–30° C. When all the coatings have been applied, the coated items are allowed to stand about 10 to 20 hours at 25–30° C. Then the assembly of α-olefin copolymer, metal, and intervening tri-layer cement is placed under pressure, such as 15–125 lbs./sq. in. and maintained under pressure during the application of heat. When the assembly is press cured, the α-olefin copolymer may be squeezed out excessively if the pressure is too high. It is, therefore, advantageous to apply a pressure below which this occurs, allow the cure to proceed for about 10–15 minutes, during which time the pressure will fall, and finally restore and maintain the initially applied pressure for the remainder of the curing time.

The cure temperatures used can generally be selected from those values recommended in the art for neoprene, styrene-butadiene rubber, and natural rubber cures. Temperatures generally range between about 130–160° C. with about 150° C. being preferred. Cure times will range between about 30–60 minutes. The cure time will vary inversely with the temperature, higher temperatures requiring shorter cure times. At 150° C. cures of 45 minutes are frequently satisfactory. Those skilled in the art can determine optimum conditions by routine empirical experiments taking into account such factors as the conditions recommended in the art for the particular curing system being used.

Any monomeric organic polyisocyanate or mixture of monomeric organic polyisocyanates can be used to coat the metal surface. The polyisocyanate can be applied as a solution in an inert volatile solvent, as in the case of the preferred adhesive methylene bis(4-phenylisocyanate). It can be applied as a liquid or melt, as in the case of toluene-2,4-diisocyanate and 1,6-hexamethylene-diisocyanate. Those skilled in the art will recognize that it is preferred that the surface of the metal be allowed to interact with the polyisocyanate coating before adhesion to the neoprene (or natural rubber or styrene-butadiene rubber). Thus coatings of slower acting polyisocyanates such as methylene bis(4-phenylisocyanate) may require a half-day or more before being ready for adhesion to neoprene. On the other hand, certain liquid polyisocyanates, such as toluene-2,4-diisocyanate or 1,6-hexamethylene diisocyanate, are applied to the metal immediately before the assembly is cured; if coatings of these polyisocyanates are exposed to moist air for unduly long periods of time, e.g., overnight, the cured assembly may display poor adhesion.

In place of the polyisocyanate one can use fully chlorinated natural rubber (cf. Rubber to Metal Bonding, S. Buchan, Palmerton, New York, 1959, page 182). Coatings of this material are stable to atmospheric moisture. In a representative procedure they are allowed to stand overnight before being adhered to neoprene. Those skilled in the art can determine by routine empirical testing the best way to apply a particular metal coating.

As said above, in using the tri-layer adhesive it is preferred to apply the polyisocyanate (or perchlorinated natural rubber) layer to the metal. The remaining layers, preferably, are coated on the α-olefin copolymer; however, all the layers may be applied to the metal. Alternatively, the metal can be successively coated with the polyisocyanate (or perchlorinated natural rubber) and the neoprene (or natural rubber or styrene-butadiene rubber); with the sulfochlorinated polymer being applied to the α-olefin hydrocarbon copolymer. If desired, the organic polyisocyanate (or the perchlorinated natural rubber) can be applied to the neoprene (or styrene-butadiene rubber) layer and this coated item placed against the metal surface or against a metal surface containing the above-described organic polyisocyanate (or perchlorinated natural rubber) coating. Representative metals whose surfaces can be bonded to α-olefin copolymers by the adhesive system of this invention include steel, stainless steel, brass and aluminum.

The invention will now be described with reference to the following examples representing preferred embodiments thereof. All parts and percentages specified therein are by weight unless otherwise indicated.

*Example I*

An adhesive composition is prepared from a chlorosulfonated polyethylene (made in accordance with the procedures of U.S. Patents 2,586,363 and 2,862,917) containing 1.0% sulfur and 26.5% chlorine; the polyethylene before sulfochlorination has a density of 0.960 and a melt index of 0.7. The composition was prepared by dissolving 10 grams of sulfochlorinated polymer in 200 grams of carbon tetrachloride and then dispersing 4 grams of super abrasion furnace black in the solution by ball-milling. The ball-milling is carried out by placing porcelain balls or cylinders in the jar containing the carbon tetrachloride solution and then allowing the jar to rotate on a set of moving rollers for a period of at least 16 hours at 25–30° C.

A neoprene cement composition is prepared from a non-sulfur modified general purpose type of neoprene ("Neoprene Type W") by compounding 100 parts on a rubber roll mill at 25–30° C. with 4 parts of magnesium oxide, 4 parts of octamine (a reaction product of diisobutylene and diphenylamine), 0.5 part of stearic acid, 50 parts of medium thermal black, 10 parts of an aromatic petroleum oil ("Sundex 85"), 10 parts of zinc oxide, 0.5 part of 2-mercaptoimidazoline, and 0.5 part of tetramethylthiuram disulfide. Ten parts of this compounded neoprene are dispersed in 100 parts of carbon tetrachloride by means of a ball mill to form a smooth cement.

A layer of ethylene hydrocarbon polymer is prepared from a copolymer containing about 48% propylene monomer units, 3.5% 1,4-hexadiene monomer units, and 48.5% ethylene monomer units having an inherent viscosity (0.1% solution by weight in tetrachloroethylene at 30° C.) of 2.5. 100 parts of this copolymer are compounded on a rubber roll mill at 25–30° C. with 5 parts of zinc oxide, 1 part of stearic acid, 80 parts of high abrasion furnace black, 90 parts of naphthenic petroleum oil ("Circo" light process oil), 0.5 part of 2-mercaptobenzothiazole, 1.5 parts of tetramethylthiuram monosulfide, and 2 parts of sulfur. The compounded stock is sheeted out at a thickness of 170 mils and cut into strips 1.25 by 6.0 inches.

Two of the strips of the ethylene hydrocarbon copolymer composition are brushed with carbon tetrachloride and are allowed to dry for 2 hours. A coat of the chlorosulfonated polyethylene composition is then applied by brush to one side of each strip. After this coating has dried 2 hours at 25–30° C., a coat of the neoprene cement is brushed on over it.

Strips (1" x 5" x 0.125") of steel and aluminum are sand blasted and thereafter brushed with carbon tetrachloride. After several hours, a freshly prepared 24% solution of purified methylene bis(4-phenylisocyanate) is brushed onto the metal strips. Two pieces of canvas backing (1.25" x 6" x 0.038") are each coated on one side only with the same isocyanate solution. Metal, canvas and rubber strips are allowed to dry for 2.5 days at 25–30° C.

The strips are then assembled as follows: canvas backing—ethylene hydrocarbon copolymer—metal, the coated surface of the canvas backing being placed against the ethylene hydrocarbon copolymer and the other coated surface of the ethylene hydrocarbon copolymer being placed against the coated metal surface. A piece of cellophane (1" x 1.25") is placed between the ethylene hydrocarbon copolymer and the metal at one end to provide flaps or grips for the Instron testing machine. Each assembly is positioned in a steel mold (1.25" x 6" x 0.75" with a ⅝" plunger) which is subsequently placed in a press which has been pre-heated to 150° C. A pressure of 31 lbs./sq. in. is applied and, after 10 minutes, the pressure is re-applied and maintained at 31 lbs./sq. in. After a total vulcanization time of 45 minutes, the heat is shut off and the press is cooled by circulating water. When the temperature has dropped to about 30–40° C., the pressure is released, and the assemblies are removed. Flashings are cut off and the assemblies are tested for peel strength by means of an Instron machine operating at a grip speed of 2" per minute. The following data are representative of those obtained at 25° C.

| Assembly: | Average peel strength (lbs./linear inch) |
|---|---|
| Steel–ethylene copolymer | 74 |
| Aluminum–ethylene copolymer | 60 |

*Example II*

If the procedures of Example I are repeated except that the strength of the isocyanate solution is decreased from 24% to 20% and metal strips of brass and stainless steel are also included for testing, the following data are representative of those obtained at 25° C.

| Assembly: | Average peel strength (lbs./linear inch) |
|---|---|
| Steel–ethylene copolymer | 68 |
| Aluminum–ethylene copolymer | 54 |
| Stainless steel–ethylene copolymer | 71 |
| Brass–ethylene copolymer | 67 |

*Example III*

If the procedures of Example I are followed except that easy processing channel black is used in the sulfochlorinated polyethylene composition instead of super abrasion furnace black and the strips are dried at 25–30° C. for 16 hours before vulcanization, the following data are representative of those obtained for the adhered assemblies at 25° C.

| Assembly: | Average peel strength (lb./linear inch) |
|---|---|
| Steel–ethylene copolymer | 39 |
| Aluminum–ethylene copolymer | 14 |

*Example IV*

If the procedures of Example I are followed except that "Thermax" thermal black is substituted for super abrasion furnace black in the sulfochlorinated polyethylene composition and the strips are dried for one night only, the adhered assemblies exhibit the following representative data at 25° C.

| Assembly: | Average peel strength (lb./linear inch) |
|---|---|
| Steel–ethylene copolymer | 108 |
| Aluminum–ethylene copolymer | 49 |

*Example V*

If the procedures of Example I are employed except that pure hexamethylene diisocyanate is substituted for the 24% solution of methylene bis(4-phenylisocyanates) for coating the metal strips and the diisocyanate is applied just 2 hours prior to the vulcanization, the adhered assemblies obtained exhibit the following representative data at 25° C.

| Assembly: | Average peel strength (lb./linear inch) |
|---|---|
| Steel–ethylene copolymer | 63 |
| Aluminum–ethylene copolymer | 59 |

*Example VI*

A neoprene cement is prepared from an all-purpose sulfur-modified neoprene having improved raw polymer stability containing a secondary aromatic amine stabilizer (Neoprene Type GN–A). About 100 parts of this neoprene are compounded on a rubber roll mill at 25–30° C. with 4 parts of magnesium oxide, 1 part of stearic acid, 75 parts of semi-reinforcing black, 15 parts of "Circo" light process oil, 5 parts of zinc oxide, 0.25 part of 2-mercaptoimidazoline, and 2 parts of N-phenyl-beta-naphthylamine. 10 parts of this compounded stock are dispersed in 100 parts of carbon tetrachloride at 25–30° C. by means of a ball mill to give a smooth cement.

The procedure of Example I above is repeated except that the neoprene cement of this example is used and the strips are dried 1 hour between coats and overnight before vulcanization. The following data for the adhered assemblies are representative of those obtained.

| Assembly: | Average peel strength (lb./linear inch) |
|---|---|
| Steel–ethylene copolymer | 68 (25° C.)<br>62 (70° C.) |
| Aluminum–ethylene copolymer | 64 (25° C.)<br>47 (70° C.) |

*Example VII*

A chlorinated natural rubber composition is obtained by dispersing 100 parts of chlorinated natural rubber containing 67% chlorine by weight ("Parlon S–20") and 37 parts of red lead oxide in 240 parts of toluene at 25–30° C. by means of a ball mill.

The general procedure of Example I above is repeated except that the chlorinated natural rubber adhesive composition of this example is substituted for the methylene bis(4-phenylisocyanate) composition. The strips are coated 1 hour apart, the neoprene coat being allowed to dry overnight at 25–30° C. Three coats of the chlorinated natural rubber cement are applied to the metals, each coating being allowed to dry at 25–30° C. for 1 hour. Canvas backing is coated on one side with a 20% solution of purified methylene bis(4-phenylisocyanate) in methylene chloride. Thus, the various layers in the adhered assembly are canvas backing, MDI, ethylene/propylene/1,4-hexadiene copolymer, chlorosulfonated polyethylene, neoprene composition, chlorinated natural rubber composition, and metal. After vulcanization according to the procedure of Example I, the adhered assemblies obtained exhibit the following representative data at 25° C.

| Assembly: | Average peel strength (lb./linear inch) |
|---|---|
| Steel–ethylene copolymer | 54 |
| Aluminum–ethylene copolymer | 53 |

*Example VIII*

A natural rubber composition is prepared by compounding 100 parts of natural rubber smoke sheet on a rubber roll mill at 25–30° C. with 12 parts of zinc oxide, 50 parts of high abrasion furnace black, 2.5 parts of stearic acid, 5 parts of sulfur, 0.36 part of 2-mercaptobenzothiazole, and 1 part of N-phenyl-beta-naphthylamine. An adhesive composition is prepared by dispersing 10 parts of this natural rubber composition in 80 parts of toluene at 25–30° C. by means of a ball mill.

A chlorinated natural rubber composition is prepared by dispersing 10 parts of chlorinated natural rubber containing 67% chlorine ("Parlon S–20") and 4 parts of super abrasion furnace black in 80 parts of toluene at 25–30° C. by means of ball-milling.

The procedure of Example I is repeated except that the natural rubber adhesive composition of this example replaces the neoprene composition and the chlorinated natural rubber composition replaces the polyisocyanate composition. The coats are applied one hour apart and the strips are dried overnight at 25–30° C. before the assemblies are vulcanized. The following data were obtained at 25° C.

| Assembly: | Average peel strength (lb./linear inch) |
|---|---|
| Steel–ethylene copolymer | 38 |
| Brass–ethylene copolymer | 40 |

*Example IX*

An ethylene/1,4-hexadiene copolymer composition is prepared from a copolymer (made in tetrachloroethylene with a diisobutyl aluminum chloride/vanadium tris(acetylacetonate) catalyst according to the general procedure of U.S. Patent 2,933,480) containing 32% trans 1,4-hexadiene monomer units, and exhibiting an inherent viscosity (0.1% solution in tetrachloroethylene at 30° C.) of 1.43. 30 parts of this copolymer are compounded on a rubber roll mill at 25–30° C. with 12 parts of super abrasion furnace black, 0.3 part of N-phenyl-beta-naphthylamine, 1.5 parts of zinc oxide, 0.23 part of tetramethylthiuram monosulfide, and 0.15 part of sulfur.

The procedure of Example VII above is repeated except that the ethylene/1,4-hexadiene copolymer of this example is substituted as the adherend in place of the ethylene/propylene/1,4-hexadiene copolymer composition given in Example I. The adhered assemblies obtained exhibit the following representative data at 25° C.

| Assembly: | Average peel strength (lb./linear inch) |
|---|---|
| Steel–ethylene/1,4-hexadiene copolymer | 60 |
| Aluminum–ethylene/1,4-hexadiene copolymer | 43 |

*Example X*

An ethylene/propylene copolymer is prepared containing 59% by weight propylene monomer units. This copolymer exhibits a Mooney viscosity (ML–4/100° C.) of 81. 30 parts of this copolymer are compounded on a rubber roll mill at 25–30° C. with 15 parts of super abrasion furnace black, 0.06 part of sulfur, 1.98 parts of a mixture 40% by weight dicumyl peroxide and 60% by weight calcium carbonate. The compounded sheets 170 mils thick are formed and thereafter treated according to the procedure of Example I.

The procedure of Example IV above is followed except that the compounded ethylene/propylene elastomer was used in place of the ethylene/propylene/1,4-hexadiene copolymer. The vulcanized assemblies obtained give the following representative data at 25° C.

| Assembly: | Average peel strength (lb./linear inch) |
|---|---|
| Steel–ethylene/propylene copolymer | 82 |
| Aluminum–ethylene/propylene copolymer | 49 |

*Example XI*

An adhesive is prepared from a chlorosulfonated polyethylene (made in accordance with procedures described in U.S. Patent 2,586,363) containing 1.5% sulfur by weight and 30% chlorine by weight; the polyethylene before sulfochlorination has a density of 0.912 and a melt index of 10. 10 parts of this composition are dissolved in 100 parts of carbon tetrachloride by means of ball-milling overnight at 25–30° C. Four parts of super abrasion furnace black are then added, and the mixture is ball-milled overnight at 25–30° C. before use.

The procedure of Example I is repeated except that the chlorosulfonated polyethylene adhesive of this example is used in place of that of Example I and a 20% isocyanate solution is employed. In addition, the coated strips are dried overnight. The cured assemblies exhibit the following representative data at 25° C.

| Assembly: | Average peel strength (lb./linear inch) |
|---|---|
| Steel–ethylene copolymer | 32 |
| Aluminum–ethylene copolymer | 35 |

*Example XII*

An adhesive composition is prepared from a chlorosulfonated polyethylene (made in accordance with the procedures of U.S. Patents 2,586,363 and 2,862,917) containing 0.97% sulfur by weight and 35.4% chlorine by weight. The polyethylene before chlorosulfonation has a density of 0.96 and a melt index of about 0.5. Ten parts of this composition are dissolved in 150 parts of carbon tetrachloride by ball-milling one night at 25–30° C. Four parts of super abrasion furnace black are added, and the mixture is ball-milled one night at 25–30° C.

The procedure of Example I is repeated except that chlorosulfonated polyethylene composition of this example is used in place of that of Example I and a 20% isocyanate solution is employed. In addition, the coated strips are dried overnight at 25–30° C. The cured assemblies exhibit the following representative data at 25° C.

| Assembly: | Average peel strength (lb./linear inch) |
|---|---|
| Steel–ethylene copolymer | 40 |
| Aluminum–ethylene copolymer | 19 |

Composite articles advantageously made by rubber to metal adhesion in accordance with this invention include motor mounts, silent block bushings, tank linings, automotive sealing components, steam hose, tank blocks, and miscellaneous diaphragms, mounts and rolls.

What is claimed is:

1. A process for adhering curable, normally solid, chain-saturated curable α-olefin hydrocarbon copolymers containing a suitable curing agent and being selected from the group consisting of copolymers of at least two α-monoolefins and copolymers of at least one α-monoolefin and at least one non-conjugated hydrocarbon diene to metal surfaces of the type described by: (A) applying therebetween the following sequence of layers: (I) an adhesive layer consisting essentially of chlorosulfonated olefin polymer containing 5–50% chlorine and 0.25–3% sulfur in contact with said α-olefin copolymer; (II) a layer consisting essentially of curable rubber selected from the group consisting of neoprene, styrene-butadiene rubber and natural rubber with a suitable curing agent; and (III) a layer consisting essentially of rubber-metal adhesive selected from the group consisting of monomeric organic polyisocyanates and perchlorinated natural rubber; said layers (I), (II), and (III) each being 1–5 mils thick when dried; and (B) subjecting the above components to curing conditions.

2. A process as defined in claim 1 wherein said α-olefin hydrocarbon copolymer is a copolymer of ethylene and propylene.

3. A process as defined in claim 1 wherein said α-olefin hydrocarbon copolymer contains from about 30 to 70 weight percent ethylene units, about 30 to 70 weight percent propylene units and up to about 5 weight percent 1,4-hexadiene units.

4. A process as defined in claim 1 wherein said α-olefin hydrocarbon copolymer contains from about 30 to 70 weight percent ethylene units, about 30 to 70 weight percent propylene units and up to about 5 weight percent dicyclopentadiene units.

5. A process as defined in claim 1 wherein layer (II) is a layer of neoprene.

6. A process as defined in claim 1 wherein layer (III) is methylene bis(4-phenylisocyanate).

7. An assembly curable to an adhered composite article comprising in sequence: (I) a curable layer of a normally solid α-olefin hydrocarbon copolymer containing a suitable curing agent and being selected from the group consisting of a copolymer of at least two α-monoolefins and a copolymer of at least one α-monoolefin with at least one non-conjugated hydrocarbon diene; (II) an adhesive layer consisting essentially of a chlorosulfonated olefin polymer containing 5–50% chlorine and 0.25–3% sulfur; (III) a curable layer consisting essentially of a rubber selected from the group consisting of neoprene, styrene-butadiene rubber and natural rubber with a suitable curing agent, and (IV) a metal surface of the type described adjacent layer (III) which has been reactively covered with a rubber-metal adhesive selected from the group consisting of monomeric organic polyisocyanates and perchlorinated natural rubber, layers (II) and (III) being 1–5 mils thick.

8. An assembly as defined in claim 7 wherein layer (I) is a copolymer of ethylene and propylene.

9. An assembly as defined in claim 7 wherein layer (I) is a copolymer containing from about 30 to 70 weight percent ethylene units, about 30 to 70 weight percent propylene units and up to about 5 weight percent 1,4-hexadiene units.

10. An assembly as defined in claim 7 wherein layer (I) is a copolymer containing from about 30 to 70 weight percent ethylene units, about 30 to 70 weight percent propylene units and up to about 5 weight percent dicyclopentadiene units.

11. An assembly as defined in claim 7 wherein layer (III) is a layer of neoprene.

12. An assembly as defined in claim 7 wherein said polyisocyanate is methylene bis(4-phenylisocyanate).

13. An adhered, cured composite article comprising the following sequence of layers subjected to curing conditions: (I) a layer of a normally solid α-olefin hydrocarbon copolymer containing a suitable curing agent and being selected from the group consisting of a copolymer of at least two α-monoolefins and a copolymer of at least one α-monoolefin with at least one non-conjugated hydrocarbon diene; (II) an adhesive layer consisting essentially of a chlorosulfonated olefin polymer containing 5–50% chlorine and 0.25–3% sulfur; (III) a layer consisting essentially of rubber selected from the group consisting of neoprene, styrene-butadiene rubber and natural rubber with a suitable curing agent, and (IV) a metal surface of the type described adjacent layer (III) which has been reactively covered with a rubber-metal adhesive selected from the group consisting of monomeric organic polyisocyanates and perchlorinated natural rubber, layers (II) and (III) being 1–5 mils thick.

14. An adhered article as defined in claim 13 wherein layer (I) is a copolymer of ethylene and propylene.

15. An adhered article as defined in claim 13 wherein layer (I) is a copolymer containing from about 30 to 70 weight percent ethylene units, about 30 to 70 weight percent propylene units and up to about 5 weight percent 1,4-hexadiene units.

16. An adhered article as defined in claim 13 wherein layer (I) is a copolymer containing from about 30 to 70 weight percent ethylene units, about 30 to 70 weight percent propylene units and up to about 5 weight percent dicyclopentadiene units.

17. An adhered article as defined in claim 13 wherein layer (III) is a layer of neoprene.

18. An adhered article as defined in claim 13 wherein said polyisocyanate is methylene bis(4-phenylisocyanate).

References Cited by the Examiner

UNITED STATES PATENTS

| | | |
|---|---|---|
| 2,711,986 | 6/55 | Strain et al. |
| 2,925,354 | 2/60 | Berardinelli et al. |
| 2,936,261 | 5/60 | Cole. |
| 3,051,666 | 8/62 | Shoddon. |

FOREIGN PATENTS

| | | |
|---|---|---|
| 493,139 | 10/38 | Great Britain. |
| 642,345 | 8/50 | Great Britain. |
| 604,243 | 8/60 | Canada. |

OTHER REFERENCES

Yerzley, F. L.: Adhesion of Neoprene to Metal, Industrial and Engineering Chemistry 31 (8), August 1939, pp. 950–956.

EARL M. BERGERT, *Primary Examiner.*

UNITED STATES PATENT OFFICE

CERTIFICATE OF CORRECTION

Patent No. 3,179,554 April 20, 1965

Edward Karcher Gladding et al.

It is hereby certified that error appears in the above numbered patent requiring correction and that the said Letters Patent should read as corrected below.

Column 3, line 16, for "provides" read -- peroxides --; column 5, line 18, for "substantially" read -- particularly --.

Signed and sealed this 14th day of September 1965.

:AL)

est:

NEST W. SWIDER
sting Officer

EDWARD J. BRENNER
Commissioner of Patents